June 12, 1962 L. J. SCHLEE 3,038,263
SILO HEATER

Filed June 2, 1959 2 Sheets-Sheet 1

INVENTOR.
LEONARD J. SCHLEE
BY
ATTORNEY

June 12, 1962  L. J. SCHLEE  3,038,263
SILO HEATER

Filed June 2, 1959

INVENTOR.
LEONARD J. SCHLEE
BY
ATTORNEY 3,038,263
SILO HEATER
Leonard J. Schlee, Fillmore, Minn.
(Rte. 1, Mabel, Minn.)
Filed June 2, 1959, Ser. No. 817,595
4 Claims. (Cl. 34—34)

This invention relates to the heating of silage and more particularly to the heating of silage with warm air currents.

One of the major problems in the winter feeding of farm animals is the freezing of silage. Frozen silage obviously is not healthful or beneficial to the animals. Further, because of freezing, it is often times necessary to loosen the silage with a pick which is extremely time consuming.

For the most part, freezing occurs around the periphery of the silo walls and the center remains relatively warm as the result of heat generated by the mass of curing silage. It is therefore a primary object of the invention to over-come the freezing conditions in silos by providing a novel silage heater which confines the heat to the periphery of the silo thereby keeping the heat required to a minimum.

Another object of the invention is to provide a method and apparatus for circulating a confined layer of air around the periphery of a silo to prevent the silage from freezing.

A further object of the invention is to provide a silage heater which heats the silage uniformly without burning or scorching.

Other objects and advantages of the invention will become apparent during the course of the following description, when taken in connection with the accompanying drawings.

In the drawings, wherein like numerals are employed to designate like parts throughout the same:

Figure 1:
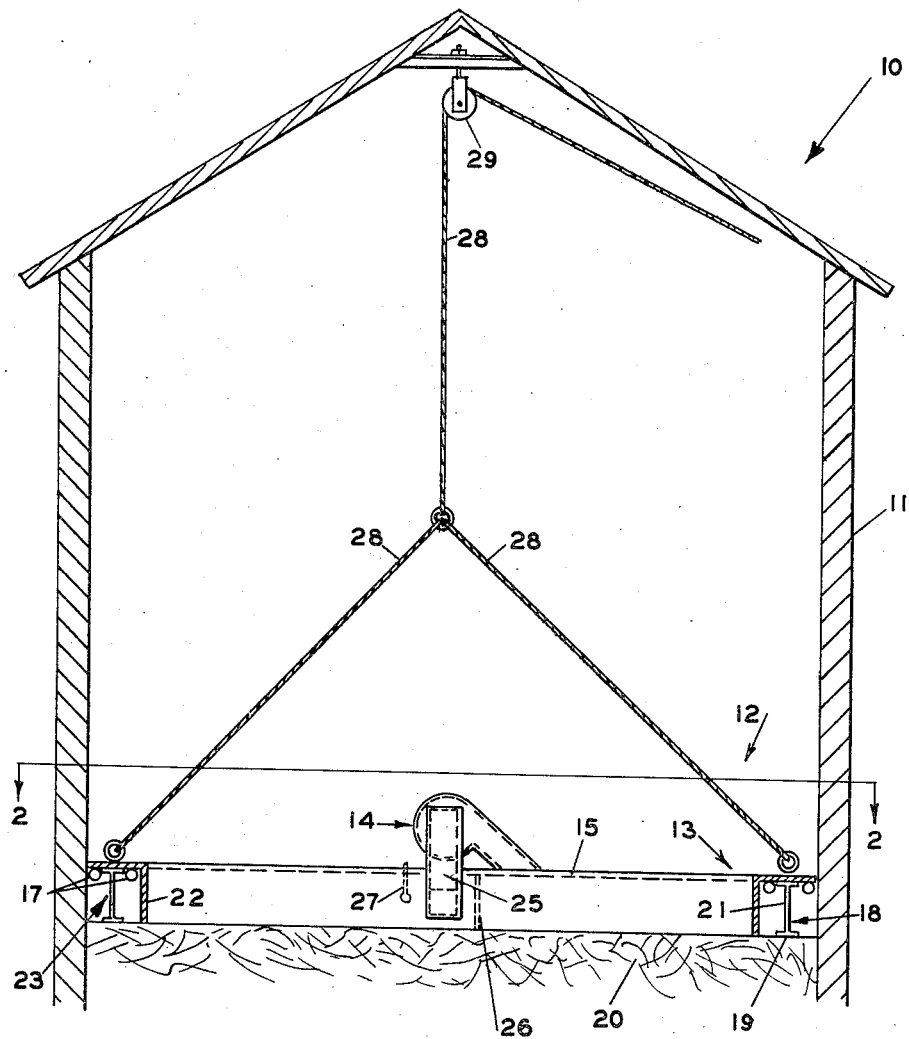
FIG. 1 is a vertical sectional view showing the silage heater of the invention located within a silo.
Figure 2:
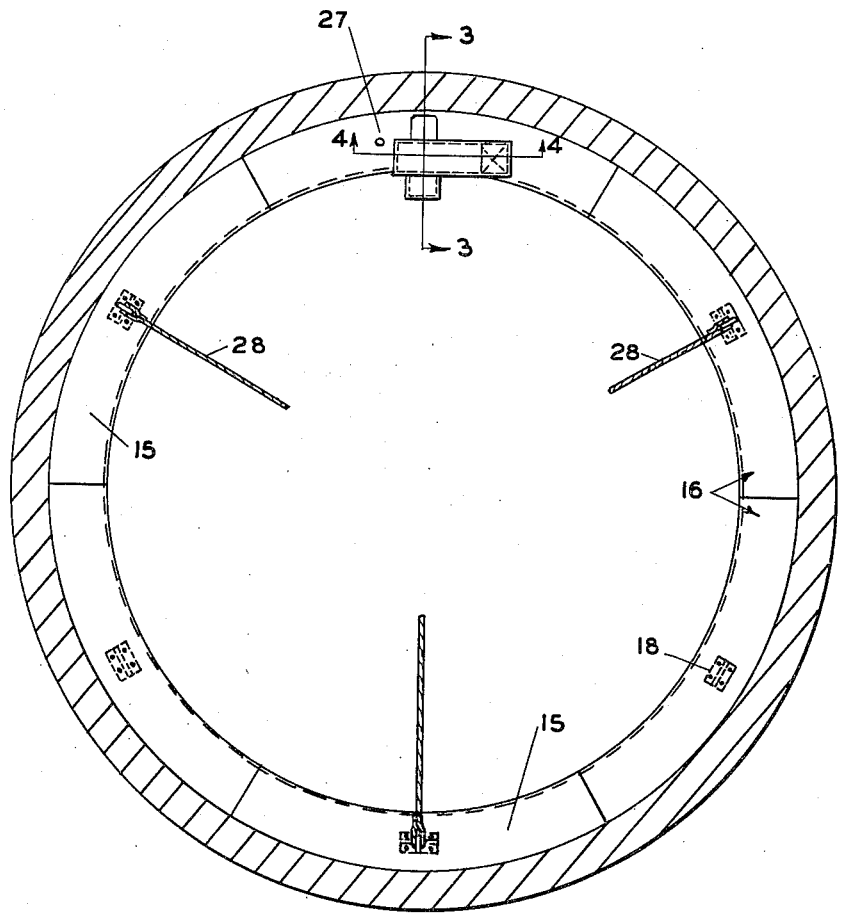
FIG. 2 is a plan view taken along lines 2—2 of FIG. 1.

Referring now to the drawings, there is shown in FIG. 1 a conventional silo 10 having a circular side wall 11. Located within the confines of the silo is a silage heater 12 of the invention.

Basically, the heater comprises a duct generally indicated at 13 which conforms to the shape of the inner silo wall and is adapted to be positioned in close proximity thereto. A blower 14 is connected to force air through the duct. By confining the air to the narrow area along the silo side, a minimum of heat is used. At the same time, however, freezing temperatures are not permitted to penetrate toward the center of the silage which is generally warmer because of the heat generated by the before-mentioned curing process.

The duct 13 has a circular top 15 of plywood, sheet metal, or the like, having an outer diameter slightly smaller than the inside of the silo wall so that it may be moved upwardly or downwardly in the silo. The top 15 may be sectionalized as at 16 for disassembly and is supported on a pair of circularly bent pipes or tubes 17. However, angle iron and similar structural material also may be used. The pipes 17 are connected at spaced points to short "I" shaped support sections 18, the bottom flanges or pads 19 of which rest on the silage 20 to support the duct thereabove. The webs 21 of the "I" shaped sections are disposed substantially parallel to the silo walls so as not to obstruct air passage through the duct as will be described later.

A side wall 22 is fastened to the duct top 15 and extends downwardly about the same distance as the "I" sections to meet the silage. The side wall 22 may be of plywood, sheet metal, or canvas. The latter material is somewhat desirable because of its flexibility and lightness.

In reviewing FIG. 1, it will be seen that a confined air passage 23 is formed by the top 15 and the duct side wall 22 in conjunction with the silage 20 as the bottom and the silo wall 11 as the other side wall.

Figures 3, 4:
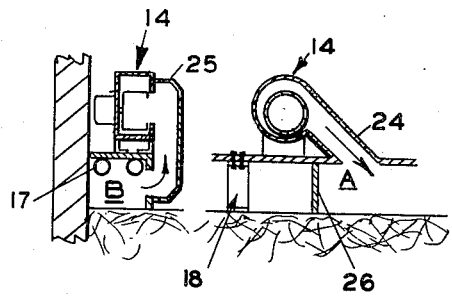
FIG. 3 is a sectional view of a heating unit blower taken along lines 3—3 of FIG. 2.
FIG. 4 is a sectional view of the heating unit blower taken along lines 4—4 of FIG. 2.

Air is forced through the duct so formed by the blower 14 which directs the air as at "A" (FIG. 4) through a discharge pipe 24. To keep the operating cost at a minimum, a closed circulatory system is used and air is taken into the blower as at "B" (FIGS. 3 and 4) through an intake pipe 25 after it has traversed the length of the duct. A baffle 26 extends transversely of the duct between the discharge pipe 24 and the intake pipe 25 and compels the air to pass through the blower 14 to be reheated. In other words, the air cannot travel more than the 360 degrees of the duct without again passing through the blower. In the present instance while the air is heated as it passes through the blower, it obviously may be heated by heating elements located in the duct.

To control the duct air temperature, there is provided a thermostat 27. Preferably the thermostat is positioned in the duct close to the intake pipe 25 since the air will be the coolest at this point after transversing the length of the duct. The thermostat may be such that it turns off the blower completely, or it may turn off pre-selected heating elements while leaving others on.

As an alternate embodiment, a gas-heater blower has also been used to supply heat to the duct rather than the electric units noted above. In any case, however, it is desirable that the blowers be easily detachable so that the duct may be moved to accommodate new silage levels. Of course, the blower does not have to be mounted on the duct itself. Instead, it may rest on the silage and the intake and discharge pipes extended to the duct. Where installations are to be made in unusually large silos, it is within the realm of the invention to use two or more blowers to supply the necessary air volume.

While the silo is being filled, the heating unit may be lifted to the top of the silo by means of a flexible rope or cable 28 passed over a suitable pulley 29. Before moving the heating unit to the side top, the blower may or may not be quickly disconnected depending on the type used. After the silo has been filled, the heating unit is lowered to allow the duct 13 to rest on top of the silage by means of the "I" sections 18. As the silage is extracted from the silo and from under the duct, the duct moves down gradually. The use of a canvas side for the wall 22 is extremely advantageous in some cases as it can be folded upwardly to permit access under the duct top 15. Silage is also easily removed from underneath the flanges 19 of the "I" support sections since they are relatively small. To maintain an extremely tight seal, it is sometimes desirable to throw a light layer of silage on the duct top 15 and in contact with the silo wall 11. Also silage can be thrown along the bottom of the side 22 to seal it in contact with the silage base.

After the duct is in place, the blower is turned on to circulate the desired warm air. It has been found that the heat penetrates the silage between six to twelve inches thereby preventing frozen silage around the periphery of the wall 11 depending on the thermostat setting. In addition, because of the heat barrier, the cold does not penetrate to the center area of the silage. Thus, the present invention makes it possible to have a top layer of silage which is relatively warm and easily removable from the silo even in the coldest weather. It also provides a relative warm silage which is far more healthful and beneficial for the animals making possible greater milk yields.

It is to be understood that the forms of the invention disclosed herein are to be taken as the preferred embodiments thereof, and that various changes in the shape, size and arrangement of parts may be resorted to without departing from the spirit of the invention or the scope of the following claims.

I claim:

1. A method of heating silage in a silo which comprises a passing layer of heated air around and in contact with the peripheral inside wall of said silo directly above the silage therein and in contact with the top of said silage, and at the same time confining said layer of heated air to a marginal top area of said silage directly inwardly of and adjacent said wall while leaving the central area of said silage untouched by said heated air, and recirculating said air and adding make up heat to maintain the temperature thereof at the predetermined level.

2. A silage heater for use in combination with a silo having an inner wall comprising, a closed loop duct including a top and side wall, said duct being shaped to conform to the configuration of said inner silo wall and being open at the bottom thereof to allow silage in said silo to form the bottom thereof, said side wall of said duct being spaced inwardly of said silo wall and positioned to engage and seal said duct against silage in said silo when said heater is moved into contact therewith, heating means connected to said duct, a blower having its intake and exhaust sections connected to said duct and adapted to circulate air past said heating means, and baffle means in said duct system between said blower intake and exhaust sections serving to prevent air in said duct from passing around the closed loop of said duct without passing through said blower.

3. A silage heater for use in combination with a silo having an inner wall, comprising a duct conforming to the configuration of and being slightly smaller than the inner wall of said silo, said duct having a top and side wall and being open at the side adjacent to said silo wall to allow the latter to form one side of said duct, said duct being open at the bottom thereof to allow the silage in said silo to form the bottom wall of said duct, means for supporting said duct system in contact with said silage, and blower attached to said duct to circulate air therethrough in contact with said silo wall and said silage.

4. The silage heater as in claim 3 wherein the side wall of said duct is of a relatively soft flexible material.

References Cited in the file of this patent

UNITED STATES PATENTS

| | | |
|---|---|---|
| 474,676 | Morton | May 10, 1892 |
| 1,166,274 | Stoik et al. | Dec. 28, 1915 |
| 1,560,713 | Nelson | Nov. 10, 1925 |
| 1,899,704 | Lutz | Feb. 28, 1933 |
| 2,044,370 | Shodron | June 16, 1936 |
| 2,365,240 | Arnold | Dec. 19, 1944 |